United States Patent
Ersoy

(10) Patent No.: US 7,044,048 B2
(45) Date of Patent: May 16, 2006

(54) DRIVE UNIT FOR A MOTOR VEHICLE AXLE STABILIZER

(75) Inventor: Metin Ersoy, Walluf (DE)

(73) Assignee: ZF Lemförder Metallwaren AG, Dielingen (DE)

( * ) Notice: Subject to any disclaimer, the term of this patent is extended or adjusted under 35 U.S.C. 154(b) by 94 days.

(21) Appl. No.: 10/895,148

(22) Filed: Jul. 20, 2004

(65) Prior Publication Data

US 2004/0262858 A1 Dec. 30, 2004

Related U.S. Application Data

(63) Continuation of application No. PCT/DE03/03047, filed on Sep. 12, 2003.

(30) Foreign Application Priority Data

Sep. 13, 2002 (DE) .................. 102 42 724

(51) Int. Cl.
B60G 21/10 (2006.01)
(52) U.S. Cl. ............................. 92/31; 92/136
(58) Field of Classification Search ............ 92/26, 92/31, 33, 136
See application file for complete search history.

(56) References Cited

U.S. PATENT DOCUMENTS

| 2,757,938 A | * | 8/1956 | Crowder .................... 92/31 |
| 2,808,033 A | * | 10/1957 | Geier et al. ................ 92/31 |
| 3,198,539 A | * | 8/1965 | McMullen et al. .......... 92/31 |

FOREIGN PATENT DOCUMENTS

| DE | 4135928 A1 | * | 5/1993 |
| DE | 100 37 486 A1 | | 2/2002 |
| EP | 1 057 666 A2 | | 12/2000 |
| GB | 518238 | | 2/1940 |

* cited by examiner

*Primary Examiner*—Thomas E. Lazo
(74) *Attorney, Agent, or Firm*—Mcglew & Tuttle, P.C.

(57) ABSTRACT

A drive unit is provided for the coaxial twisting movement of two stabilizer halves of a motor vehicle axle stabilizer with a tubular housing. Two housing halves are provided having an interior of which a hydraulically movable actuating piston is arranged displaceably in relation to the longitudinal axis of the housing. The longitudinal displacement of the piston is converted by an intercalated cam drive into a rotary movement of the housing halves around their common longitudinal axis. The housing halves are fixed with their respective free ends facing away from one another at a stabilizer halve. A hydraulically actuated releasing piston is pretensioned against a spring element and arranged at each opposite flat sides of the actuating piston, wherein the releasing pistons make possible the displacing movement of the central actuating piston in the pretensioned position and fix the actuating piston in its middle position in the released position.

11 Claims, 4 Drawing Sheets

DRIVE UNIT FOR A MOTOR VEHICLE AXLE STABILIZER

CROSS REFERENCE TO RELATED APPLICATION

This is a continuation of and claims the benefit (35 U.S.C. §120 and 365(c)) of copending International Application PCT/DE 03/03047 of Sep. 12, 2003, which designated inter alia the United States and which claims the priority of German Application DE 102 42 724.0 of Sep. 13, 2002. The entire contents of each application is hereby incorporated by reference in its entirety.

FIELD OF THE INVENTION

The present invention pertains to a hydraulic drive unit for the coaxial twisting movement of two stabilizer halves of a motor vehicle axle stabilizer with a tubular housing, which comprises two housing halves and in the interior of which a hydraulically movable actuating piston is arranged displaceably in relation to the longitudinal axis of the housing, wherein the longitudinal displacement is converted by means of an intercalated cam drive into a rotary movement of the housing halves around their common longitudinal axis, and wherein the housing halves are fixed with their respective free ends facing away from one another at one of the respective stabilizer halves each.

BACKGROUND OF THE INVENTION

Axle stabilizers, for which the drive unit of this type is designed, are used, in general, to reduce or even fully compensate rolling movements of the body around the longitudinal axis of the vehicle, which occur because of the lateral acceleration during travel in curves. The wheel carriers, which usually belong to the same axle of the vehicle, are connected with one another via a split axle stabilizer bar, and the axle stabilizer parts are fixed at the same time rotatably at the vehicle body by means of separate bearing elements. The ends of the stabilizer halves, which are located opposite each other and are not fixed to the wheel carrier, are coupled by means of an intercalated rotary drive. The drive unit arranged between the two stabilizer halves as a part of the rotary drive is used to twist the axle stabilizer ends in relation to one another, which may markedly increase the stability of the vehicle against rolling.

When such hydraulic drive units are used, it shall be guaranteed for safety reasons that no uncontrolled adjustment of the rotary drive and consequently no unintended change in the properties of the axle stabilizer are brought about in case of failure of the corresponding hydraulic circuit or in case of errors in the electrical system of the motor vehicle. The hydraulic drive units known from the state of the art are equipped for this purpose with expensive and bulky pressure reservoirs with valve systems belonging to them.

Moreover, automatic adjustment of the rotary drive into a predefined neutral position, in which the axle stabilizer assembly unit has a medium torsional rigidity, is desirable in case of the above-described failures of the hydraulic and electrical systems of the motor vehicle.

SUMMARY OF THE INVENTION

The object of the present invention is therefore to provide a drive unit of the type described in the introduction with a safety means that ensures the fixing of the stabilizer adjustment in a predefined neutral position in case of failure of the system in a simple and inexpensive manner.

According to the invention, a drive unit is provided for the coaxial twisting movement of two stabilizer halves of a motor vehicle axle stabilizer. The drive unit has a tubular housing, which comprises two housing halves. In the interior a hydraulically movable actuating piston is arranged displaceably in relation to the longitudinal axis of the housing. The longitudinal displacement is converted by means of a intercalated cam drive into a rotary movement of the housing halves around their common longitudinal axis. The housing halves are fixed with their respective free ends facing away from one another at a stabilizer half each. Hydraulically actuated releasing pistons, which can be pretensioned against a spring element, may be arranged at the opposite flat sides of the actuating piston, and the respective releasing pistons make possible the displacing movement of the actuating piston in the pretensioned position and fix the actuating piston in its middle position in the released position.

The design embodiment makes possible a compact design and is used to utilize the hydraulically generated pretension of the releasing piston for the longitudinal adjustment of the actuating piston bringing about the twisting of the stabilizer arrangement in case of failure of the electrical, pneumatic or hydraulic system. The spring force for the displacement of the actuating piston may be advantageously ensured by a pneumatic spring; moreover, the use of coil springs is also conceivable due to the compact dimensions of these springs.

Corresponding to an advantageous variant of the subject of the present invention, the drive unit may be a hydraulic drive unit, and it is especially advantageous in view of the compact dimensions of the entire stabilizer adjustment unit if the releasing piston and the actuating piston are arranged concentrically with the longitudinal axis of the hydraulic drive unit.

To avoid needless loads on the hydraulic pump responsible for the hydraulic circulation, it may, moreover, be expedient to embody the control of the releasing pistons and the stopping of the latter in their pretensioned position by an electrically actuated seat valve. When hydraulics is mentioned here, it is, of course, also possible in the sense of the present invention to use other medias or energies (pneumatic energy, electricity, etc.) to operate the system or parts thereof. An exemplary embodiment of the subject of the present invention will be explained in greater detail below on the basis of the drawings attached.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
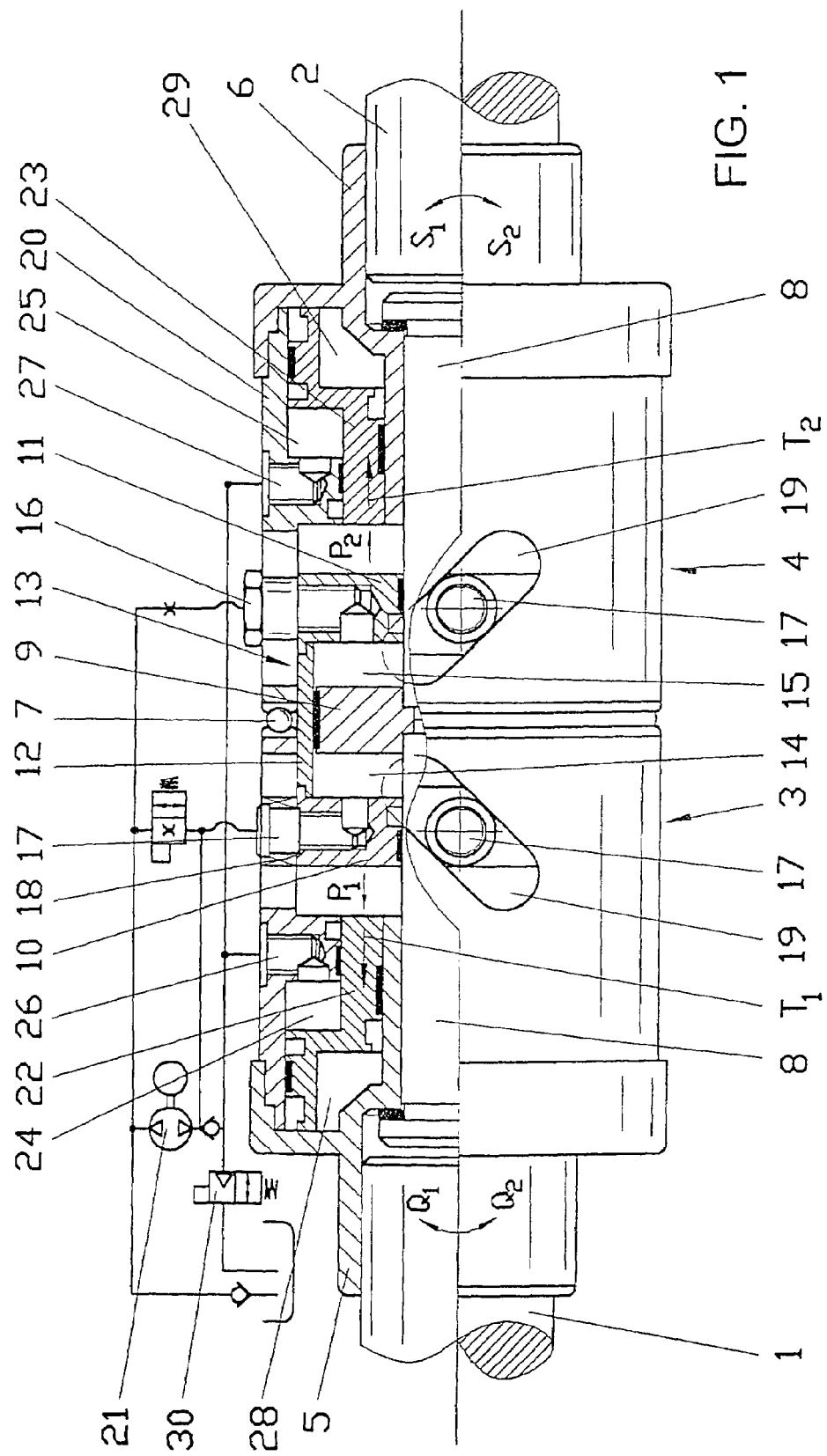
FIG. 1 is a half section through a hydraulic drive unit for twisting the ends of two stabilizer halves of a motor vehicle axle stabilizer in relation to one another.
Figure 2:
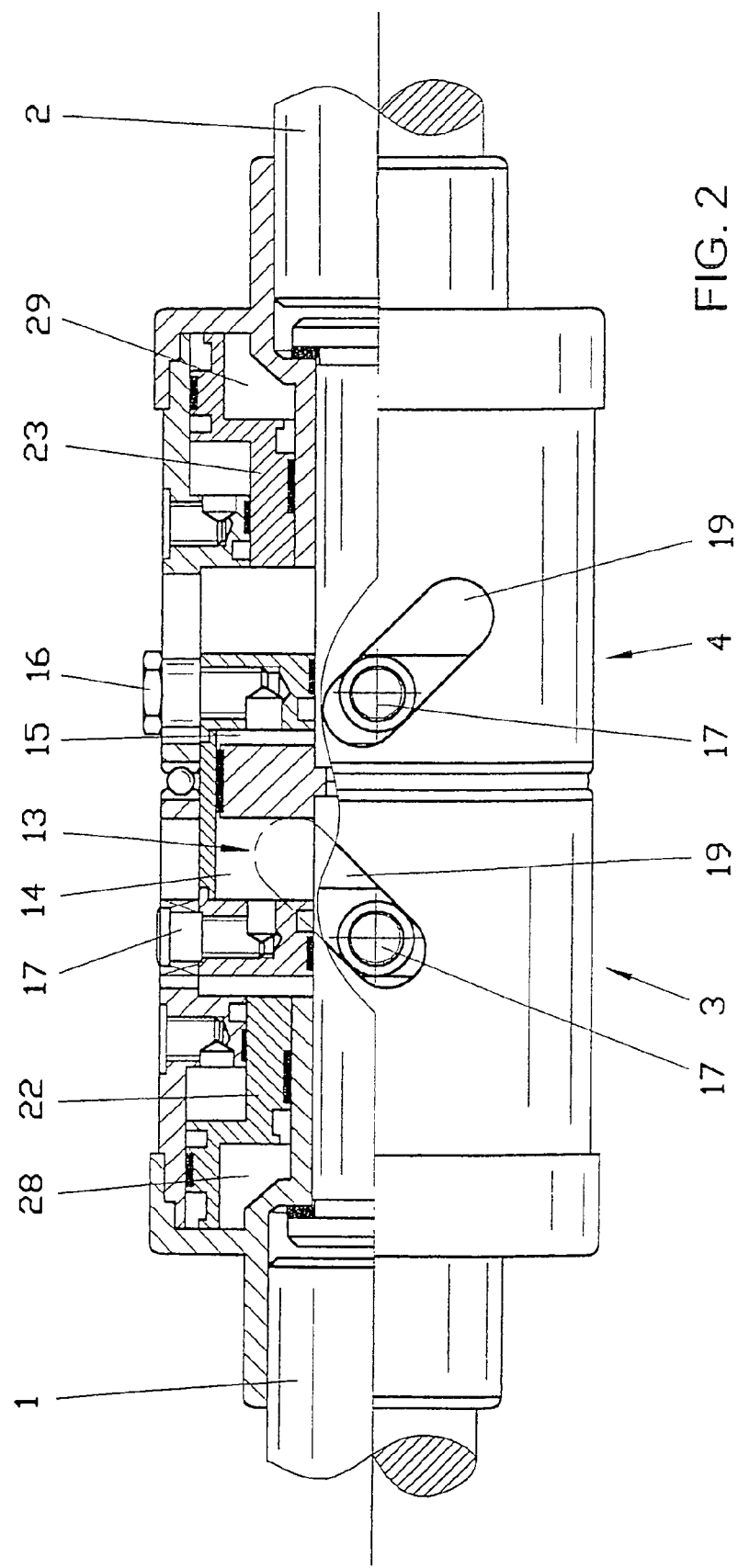
FIG. 2 is a partial sectional view of the exemplary embodiment from FIG. 1 in the operating state of stabilizer halves twisted in relation to one another.
Figure 3:
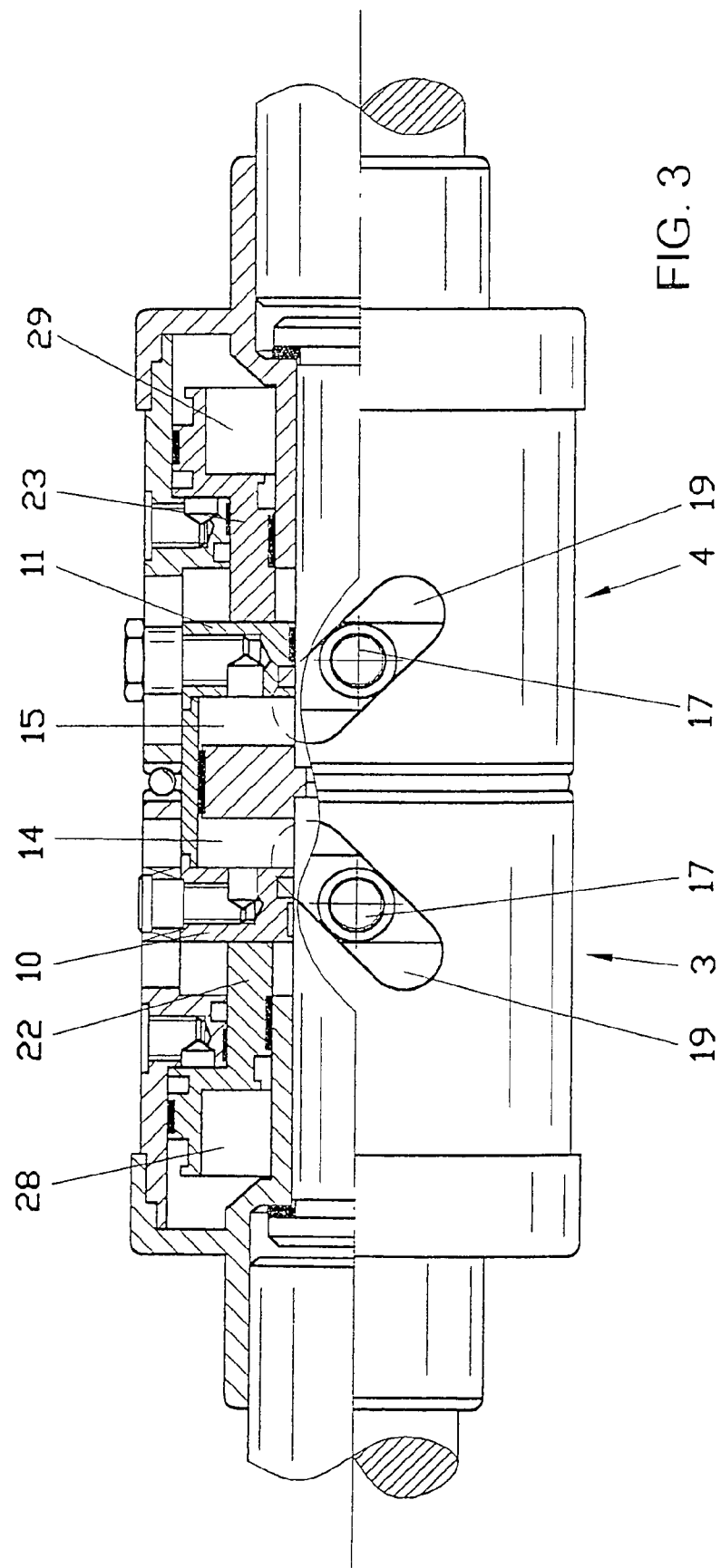
FIG. 3 is a partial sectional view of the exemplary embodiment according to FIGS. 1 and 2 in the operating position in case of failure of the connected hydraulic network.

The hydraulic drive unit shown in FIGS. 1 through 3 is part of a rotary drive, which is used to twist the ends of two stabilizer halves 1, 2. The stabilizer halves 1, 2 are parts of a motor vehicle axle stabilizer, which is not shown here specifically. The other ends of the stabilizer halves 1 and 2, which are not shown here, are fixed at the wheel suspension of a respective wheel of a motor vehicle axle and are used to reduce rolling movements of the body around the longitudinal axis of the vehicle, which occur because of the lateral acceleration during the travel of a motor vehicle in curves.

The hydraulic drive unit according to the present invention is part of the rotary drive, which comprises essentially two housing halves 3 and 4, which are twistable in relation to one another and are connected via a flange 5, 6 each arranged at each housing half 3, 4 with the stabilizer ends 1 and 2, rotating in unison with them.

A thrust ball bearing 7, which makes possible the twisting movement of the housing halves 3 and 4 in relation to one another, is arranged in the middle between the two housing halves. The housing halves 3 and 4 are braced against each other via a central threaded pin 8. A fixed partition 9, which is arranged in the interior of an actuating piston 13 formed by two side walls and a cylindrical connection web 12, is located centrally in the middle of the rotary drive formed by the two housing halves 3 and 4. Two piston spaces 14 and 15, to which oil pressure can be admitted through connections 16 located in the side walls 10 and 11, are created due to the design of the actuating piston 13 in conjunction with the partition 9.

The connection 16 for the piston space 15 is shown in all FIGS. 1 through 4, and a connection of the same type for the piston space 14 is located in the side wall 10 of the actuating piston 13, radially offset and not visible in the figures. Besides the connections 16 for the oil supply, three cams 17 protruding above the circumference of the side walls are located in the side walls 10 and 11, distributed over the circumference, and they are arranged distributed by 120° over the circumference of the cylindrical side walls 10 and 11. The cams 17 are provided in their area projecting above the circumference of the side walls 10 with a needle bearing 18 each, which are recessed in elongated hole-like openings 19 in the outer walls of the cylindrical housing halves 3 and 4.

The cams arranged in the side walls 10 and 11 form, together with the openings 19 distributed over the circumference of the housing walls 20, a cam drive, which converts a translational motion of the actuating piston 13 in the direction of the arrows $P_1$ and $P_2$ into a rotary movement corresponding to the arrows $Q_1$, $Q_2$ for the housing half 3 and $S_1$, $S_2$ for the housing half 4.

To explain the mode of operation of the rotary drive, the operating state will be described on the basis of FIG. 2, in which oil is admitted under pressure into the piston space 14 via one of the connections 16 by a hydraulic pump 21. The piston space 14 is enlarged due to this measure, causing a translational displacement of the actuating piston 13 in the direction of arrow $P_1$. The cams 17 arranged in the side walls 10 and 11 move simultaneously with the actuating piston 13 due to this displacement. Since the housing halves 3 and 4 and the openings 19 are restrictedly guided by the cams 17, twisting of the housing halves 3 in the direction of arrow $P_1$ is brought about at the same time by the movement of the actuating piston 13 in the direction of arrow $P_1$, whereas the housing half 4 is twisted by the movement of the actuating piston 13 in the direction of arrow $S_2$ in the opposite direction. Thus, the admission of a certain amount of oil under pressure to the piston space 14 corresponds to a corresponding twisting of the ends of the stabilizer halves 1 and 2 in relation to one another.

Should a line rupture occur in the connected hydraulic circuit or should the hydraulic pump fail to pump because of a defect in the electrical system of the motor vehicle, no pressure is inherently admitted into the piston space 14, so that an uncontrolled displacement of the actuating piston 13 would be impossible.

The solution offered by the present invention is a further improvement of the rotary drive described such that an uncontrolled translational motion of the actuating piston 13 is ruled out in case of failure of the hydraulic or electrical system of the motor vehicle.

A respective, hydraulically actuated releasing piston 22 and 23, which can be pretensioned against a spring force, is located for this purpose within the housing halves 3 and 4 on the outside of the actuating piston facing away from the piston spaces 14 and 15. Oil is admitted under pressure into the releasing pistons 22 and 23 into the piston spaces 24 and 25, which are defined between the releasing piston 22 and 23 and the housing wall, and to which oil is admitted under pressure by the hydraulic pump 21 via the connections 26 and 27, respectively. On the side of the releasing pistons 22 and 23 facing away from the piston spaces 24 and 25, there is a compressed air cushion 28 and 29 each, which are compressed in the views shown in FIGS. 1 and 2 because of the displacement of the releasing pistons 22 and 23 in the direction of the arrows $T_1$ and $T_2$, which displacement is brought about by the admission of oil into the piston spaces 24 and 25 under pressure. The compression of the pressurized medium contained in the compressed air cushion spaces 28 and 29 produces a spring force, which is in equilibrium with the pressure oil located within the piston spaces 24 and 25 during the normal operating state of the hydraulic drive unit. This state is maintained by means of the electrically actuated seat valve 30.

The view in FIG. 3 illustrates how the operating state shown in FIGS. 1 and 2 changes as soon as an error develops within the hydraulic or electrical system of the motor vehicle. It can be recognized from FIG. 3 that the lack of admission of oil under pressure into the entire device makes possible, as was already described in the introduction, a displacement of the actuating piston 13 and a displacement of the releasing pistons 22 and 23 is brought about at the same time as a consequence of the expansion of the air within the compression air cushions 28 and 29 because of the lack of admission of oil under pressure into the piston spaces 24 and 25. The stored spring forces of the compressed air cushions push the releasing pistons 22 and 23 in the direction of the actuating piston 13 until the front surface of the releasing pistons comes into contact with the outsides of the side walls 10 and 11 of the actuating piston 13. Due to the symmetrical design of the releasing pistons 22 and 23, the actuating piston 13 is pushed into the middle position shown in FIG. 1 if it was displaced, for example, in the direction of arrow $P_1$ corresponding to FIG. 2. The actuating piston 13 is then fixed in the middle position, so that a neutral position of the entire axle stabilizer arrangement is guaranteed.

It shall be noted in this connection that the pretension of the releasing pistons 22 and 23 is usually brought about in the piston spaces 24 and 25 in less than 1 sec in case of intact hydraulic and electrical systems when the vehicle is put into operation as a consequence of the build-up of the oil pressure of the hydraulic pump 21. The seat valve 30 then fixes the above-mentioned state of the releasing pistons 22 and 23, so that the entire axle stabilizer system is ready to operate. The readiness to operate means that the releasing pistons are in the outer position shown in FIGS. 1 and 2, so that the operating piston 13 can be displaced in the direction of the arrows $P_1$ and $P_2$.

Figure 4:
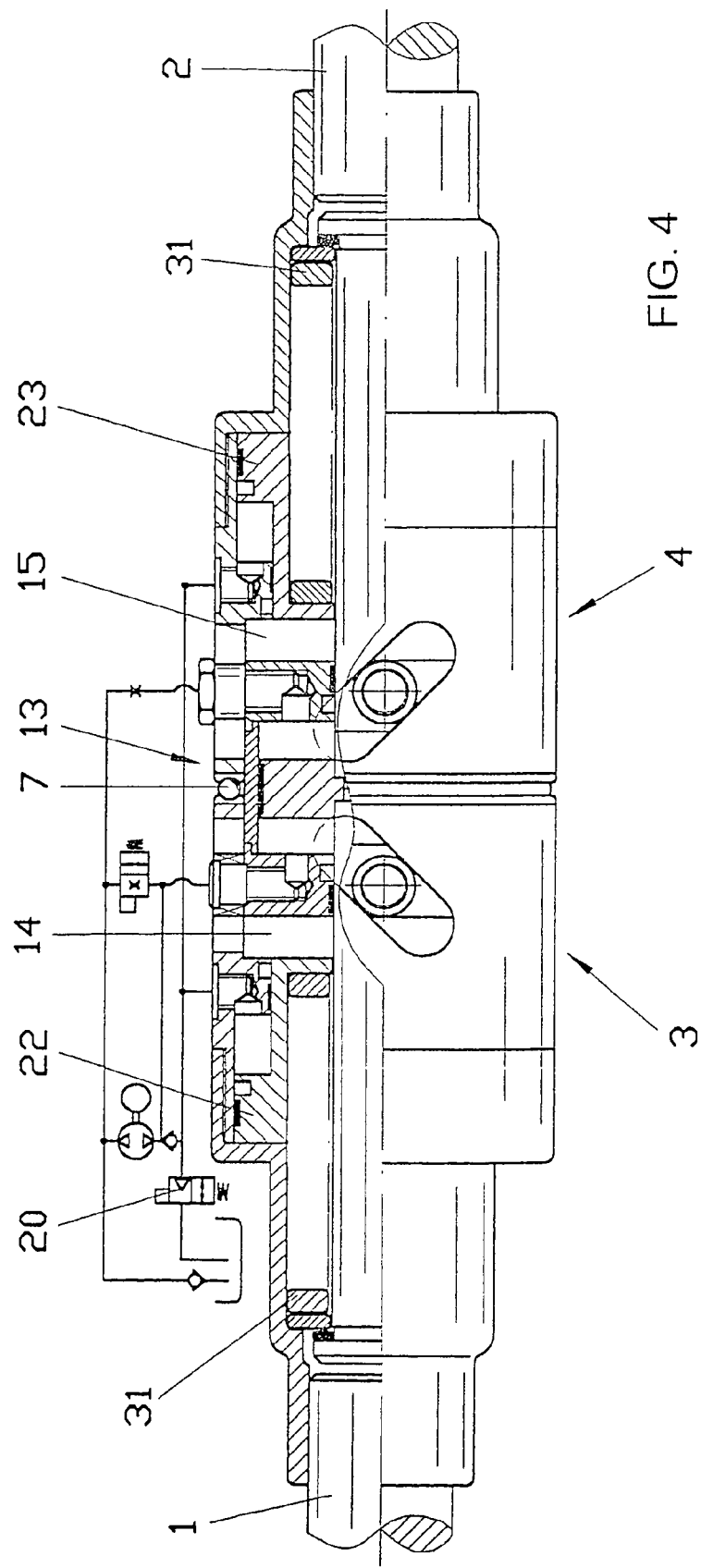
FIG. 4 is a partial sectional view through another embodiment variant similar to the exemplary embodiment according to FIGS. 1 through 3.

The view in FIG. 4 shows another embodiment variant of the subject of the present invention, which differs from the exemplary embodiment shown in FIGS. 1 through 3 essentially by the manner in which the spring pretension is generated.

Therefore, the individual parts of the exemplary embodiment according to the present invention will not be described again. It is essential that the spring pretension is provided in the exemplary embodiment shown in FIG. 4 by a coil spring 31. The view in FIG. 4 shows the normal operating state of the hydraulic drive unit, in which the releasing pistons 22 and 23 are in the spring pretension position. The actuating piston 13 is able in this position to be displaced in the direction of the ends of the stabilizer halves 1 and 2 depending on the admission of oil under pressure into the piston spaces 14 and 15.

Other spring variants, for example, plate springs, are also conceivable for providing the spring pretensioning forces. It is essential for the present invention that displacement of the actuating piston 13 into its middle neutral position is brought about in case of failure of the hydraulic system or the electrical system of the motor vehicle in question due to the release of the spring pretensioning forces as a consequence of the return movement of the releasing pistons 22 and 23, and the housing halves 3 and 4, which are coupled with the actuating piston 13 by means of the cams 19, are moved at the same time back into the neutral position from their twisted position.

While specific embodiments of the invention have been shown and described in detail to illustrate the application of the principles of the invention, it will be understood that the invention may be embodied otherwise without departing from such principles.

APPENDIX

List of Reference Numbers:
1 Stabilizer half
2 Stabilizer half
3 Housing half
4 Housing half
5 Flange
6 Flange
7 Thrust ball bearing
8 Threaded pin
9 Partition
10 Side wall
11 Side wall
12 Connecting web
13 Actuating piston
14 Piston space
15 Piston space
16 Connection
17 Cam
18 Needle bearing
19 Opening
20 Housing wall
21 Hydraulic pump
22 Releasing piston
23 Releasing piston
24 Piston space
25 Piston space
26 Connection
27 Connection
28 Compressed air cushion
29 Compressed air cushion
30 Seat valve
31 Coil spring

What is claimed is:

1. A drive unit for the coaxial twisting movement of two stabilizer halves of a motor vehicle axle stabilizer, the drive unit comprising:
a tubular housing with two housing halves having an interior;
a hydraulically movable actuating piston arranged in said interior displaceably in relation to the longitudinal axis of the housing;
intercalated cam drive, wherein the displacement in relation to the longitudinal axis is converted by means of said intercalated cam drive into a rotary movement of the housing halves around their common longitudinal axis and wherein the housing halves are fixed with their respective free ends facing away from one another at a stabilizer half each; and
a first pretensionable hydraulically actuated releasing piston and a second pretensionable hydraulically actuated releasing piston for making possible the displacing movement of the central actuating piston in the pretensioned positioning and fixing the actuating piston in a middle position in the released position against a spring element, said first actuated releasing piston and said second actuated releasing piston being arranged at the opposite flat sides of the actuating piston.

2. A drive unit in accordance with claim 1, wherein the drive unit is a hydraulic drive unit.

3. A drive unit in accordance with claim 1, wherein the spring force for pretensioning the first and second releasing piston is provided by a spring element designed as a compressed air cushion.

4. A drive unit in accordance with claim 1, wherein the spring force for pretensioning the first and second releasing piston is provided by a spring element designed as a coil spring.

5. A drive unit in accordance with claim 1, wherein the releasing piston is held in its pretensioned position by a electrically actuated seat valve.

6. A drive unit in accordance with claim 1, wherein the releasing pistons and the actuating piston are arranged concentrically with respect to the longitudinal axis of the hydraulic drive unit.

7. A motor vehicle axle stabilizer drive unit, comprising:
a tubular housing with two housing halves having an interior, the two housing halves each having a coaxial twisting movement for twisting of two stabilizer halves;
a hydraulically movable actuating piston arranged in said interior, said actuating piston being displaceable in relation to the longitudinal axis of the housing to provide a longitudinal displacement;

intercalated cam drive, wherein the longitudinal displacement is converted by means of said intercalated cam drive into a rotary movement of the housing halves around their common longitudinal axis and wherein the housing halves are fixed with their respective free ends facing away from one another at a stabilizer half each; and a first pretensionable hydraulically actuated releasing piston;

a first spring means biasing said first releasing piston in a first direction;

a second pretensionable hydraulically actuated releasing piston, said first actuated releasing piston and said second actuated releasing piston being arranged at the opposite sides of the actuating piston; and a second spring means biasing said second releasing piston in a second direction, said first releasing piston and said second releasing piston having a released position, in which said first releasing piston and said second releasing piston fix said actuating piston in a middle position.

8. A drive unit in accordance with claim 7, wherein each of said first spring means and second spring means comprise a compressed air cushion.

9. A drive unit in accordance with claim 7, wherein the spring force of said first spring means and second spring means for biasing the first and second releasing piston is provided by a spring element designed as a coil spring.

10. A drive unit in accordance with claim 7, wherein each of said first and second releasing piston is held by hydraulic fluid via an electrically actuated seat valve.

11. A drive unit in accordance with claim 10, wherein each of said first and second releasing piston and the actuating piston are arranged concentrically with respect to the longitudinal axis of the hydraulic drive unit.

* * * * *